United States Patent
James et al.

(10) Patent No.: US 11,390,758 B2
(45) Date of Patent: Jul. 19, 2022

(54) BIFUNCTIONAL COATING COMPOSITIONS

(71) Applicant: PISON STREAM SOLUTIONS INC., New York, NY (US)

(72) Inventors: Joseph H. James, New York, NY (US); Sanjana Das, New York, NY (US)

(*) Notice: Subject to any disclaimer, the term of this patent is extended or adjusted under 35 U.S.C. 154(b) by 256 days.

(21) Appl. No.: 16/587,621

(22) Filed: Sep. 30, 2019

(65) Prior Publication Data

US 2020/0102460 A1 Apr. 2, 2020

Related U.S. Application Data

(63) Continuation-in-part of application No. PCT/US2019/053345, filed on Sep. 27, 2019.

(60) Provisional application No. 62/738,027, filed on Sep. 28, 2018.

(51) Int. Cl.

| | |
|---|---|
| C09D 5/03 | (2006.01) |
| C09D 7/40 | (2018.01) |
| C09D 175/04 | (2006.01) |
| C09D 163/00 | (2006.01) |
| C09D 133/00 | (2006.01) |
| C09D 167/00 | (2006.01) |
| C08K 3/40 | (2006.01) |
| C08K 7/00 | (2006.01) |

(52) U.S. Cl.
CPC ............ C09D 5/031 (2013.01); C09D 7/70 (2018.01); C09D 133/00 (2013.01); C09D 163/00 (2013.01); C09D 167/00 (2013.01); C09D 175/04 (2013.01); C08K 3/40 (2013.01); C08K 7/00 (2013.01); C08K 2201/005 (2013.01)

(58) Field of Classification Search
CPC ........ C09D 5/031; C09D 7/70; C09D 175/04; C09D 167/00; C09D 133/00; C09D 163/00; C08K 3/40
USPC ......................................................... 524/62
See application file for complete search history.

(56) References Cited

U.S. PATENT DOCUMENTS

| | | | |
|---|---|---|---|
| 5,379,947 A | 1/1995 | Williams | |
| 6,360,974 B1 | 3/2002 | Sacharski | |
| 6,624,239 B1 | 9/2003 | Bendix | |
| 6,747,091 B1 | 6/2004 | Baumgart | |
| 6,893,710 B2 * | 5/2005 | Lee | C03C 14/004 361/321.1 |
| 7,345,108 B2 * | 3/2008 | Ambrose | C08K 3/36 524/493 |
| 9,469,768 B1 * | 10/2016 | James | C08G 18/2027 |
| 9,947,884 B1 | 4/2018 | James | |
| 10,011,736 B2 | 7/2018 | Lucas | |
| 2018/0079916 A1 | 3/2018 | Bolling | |

OTHER PUBLICATIONS

BASF, PCI Magazine, Aug. 28, 2000. (Year: 2000).*
Glassflake, ECR Glassflake, Oct. 7, 2019. (Year: 2019).*
BASF Corporation, Powder Slurries for Automotive OEM Finishing, PCI Magazine, https://www.pcimag.com/articles/85142-powder-slurries-for-automotive-oem-finishing), Aug. 28, 2000.
Simon J. Brigham and Charles Watkinson, Understanding and Use of Glass Flake, PCI Magazine, https://www.pcimag.com/articles/85328-understanding-and-use-of-glass-flake?, Mar. 2, 2009.
Glassflake Limited, ECR Glassflake, https://www.glassflake.com/products/ecr-glass-flake/, downloaded Oct. 7, 2019.
U.S. International Searching Authority, International Search Report and Written Opinion for PCT/US2019/53345 dated Nov. 25, 2019.

* cited by examiner

*Primary Examiner* — Hui H Chin
(74) *Attorney, Agent, or Firm* — Duane Morris LLP; Gregory M. Lefkowitz

(57) ABSTRACT

A free-flowing dry mix of various chemical components can be applied in its dried form, as is contemplated by typical powder coating operations, as well as dispersed within a liquid carrier and applied in liquid form. When liquefied, this bifunctional composition retains similar viscosity to liquid coatings, while simultaneously avoiding any reaction with or degradation by the liquid carrier. The liquefied powder is preferable to existing liquid coatings because it avoids the use of any volatile organic compounds or other solvents, whereas the final, cured coating produced by these bifunctional compositions are indistinguishable regardless of whether they are applied in dry or liquefied form.

20 Claims, No Drawings

BIFUNCTIONAL COATING COMPOSITIONS

REFERENCE TO RELATED APPLICATIONS

This application is a continuation of International Patent Application No. PCT/US2019/053345 filed on Sep. 27, 2019, and entitled "BIFUNCTIONAL COATING COMPOSITIONS," which claims priority to U.S. Provisional Patent Application No. 62/738,027, filed on Sep. 28, 2018, each of which are incorporated by reference in their entirety herein.

FIELD OF INVENTION

The invention relates to compositions for coating articles and, more specifically to a single powder-based composition that is "bifunctional," meaning the dry powder can be applied and cured using conventional powder coating techniques or, without any further additives or modifications, can be "liquefied" by dispersing the powder in liquid (such as water-based or other liquids, typically sold as solvents, that evaporate under ambient conditions) for use/application like a paint.

BACKGROUND

Chemical coatings are any pigmented liquids, liquefiable, or mastic composition of various chemical components that, after application to a substrate in a thin, converts to a solid film. These coating solutions can be sprayed, dipped, or applied via brushes, rollers, and the like. Chemical coatings may include a range of compositions, from solid particulates (e.g., powder coatings) to liquid and semi-liquid fluids (e.g., paints, slurries, etc.).

Powder coating typically involves a process in which a dry powder is distributed over a substrate (e.g., electrostatic spraying, fluidized bed coating, and/or hot flocking). The substrate may be heated or unheated when the powder is applied, although heat is subsequently supplied from an external source, such as an oven, causing the powder to fuse into a continuous film. Advantageously, this procedure results in a robust film with good adhesion, while effectively eliminating the need to rely upon solvents (and particularly volatile organic compounds).

A variety of specialized powder coatings are currently in use, with the dry formulations incorporating specific chemical components to impart unique properties to the final, dried coating. As one example, U.S. Pat. No. 9,469,768 discloses a powder coating formulation that, upon curing, provides chemical agent resistance. As a further example, U.S. Pat. No. 9,947,884 describes a powder coating formulation that produces electric current when exposed to sunlight. Both of these patents are incorporated by reference in their entirety herein.

Generally speaking (and as used herein), powder coatings rely on a "binder system" to form the bulk of the final, cured coating. The binder system usually includes one or more base resins and one or more curatives. Additional additives may be provided to enhance the characteristics of the base resin and curatives during the application and curing process.

Separately, a package of components influencing the performance of the final, cured coating may be mixed with the binder system. Per the examples above, this type of performance package may include any combination of colorants and finish influencing components (e.g., gloss/matte, pigments, dyes, etc.), radiation influencing components (e.g., UV-inhibitors, solar active materials, etc.), hardness and/or corrosion influencing components, and other additives (e.g., thermal or electrical related materials, etc.). Whatever the performance package may be (if any), it must be compatible with the binder system so as to allow the formulation to blend, apply/adhere to the substrate, melt, flow, and cure, as well as ensure that the final, cured coating performs as originally intended.

Although powder coatings possess numerous advantages in comparison to liquid-based paints, application of these coatings often require specialized equipment. Many consumers have experience with conventional paints and appreciate their simplicity of application and use. As a result, liquids remain in widespread use, even within industrial and commercial operations.

One problem with painted coatings is that they are often much thinner in comparison to a dry powder coating. Further, many paints rely upon volatile organic compounds ("VOC's") which may present health and environmental concerns. Further still, paint compositions run the risks of evaporation and separation upon long term storage (i.e., the solvent base degrades or evaporates and escapes into the ambient environment, while the suspended components tend to settle out of the mixture so as to require agitation to return the paint to a usable condition).

The differences between applying and curing dry powder and liquid paint compositions can result in a manufacturer being forced to acquire and maintain completely separate coating compositions and equipment. This adds cost and complexity, particularly to the extent that workers must be trained and adequate stocks of separate dry and liquid compositions must be maintained.

In an apparent attempt to realize the benefits of a bifunctional composition, "powder slurry" coating compositions were developed in the late 1990s by BASF Corporation (see "Powder Slurries for Automotive OEM Finishing," Paint & Coating Industry magazine, Aug. 28, 2000: https://www.pcimag.com/articles/85142-powder-slurries-for-automotive-oem-finishing).

U.S. Pat. Nos. 6,360,974 and 5,379,947 describe methods of preparing an aqueous-based powder slurry. These methods contemplate providing a particulate resin to a median particle size range, dispersing those particulates in an aqueous medium, and then further milling the dispersed slurry to a lesser particle size. Because this approach requires a further reduction in particle size after the slurry has been formed (i.e., wet milling) and filtration, it does not rise to the level of a truly bifunctional composition where a liquid can be added to a finished powder coating without further processing.

U.S. Pat. No. 6,624,239 describes a clear powder slurry coating using a hydroxyl-based binder, a polyisocyanate cross-linking agent, and water. U.S. Pat. No. 6,747,091 describes a clear powder slurry coating that is hardened by actinic radiation and/or thermal means. Among other potential issues, these disclosed slurry coatings may not lend themselves to the specific colors, chemical agent and weathering resistance, and/or other traits that can make powder coating more attractive than liquid-based applications. Further, the disclosed slurry components necessarily call for a balanced formulation relying on a specific combination of surfactants (to allow the formulation particulates to wet out) and dispersants (to ensure homogeneity and avoid inconsistencies in the final coating).

These and other slurry coatings ultimately proved incompatible with production processes. Further, powder for slurries possessed a relatively short shelf life (one month at 20° C.), and both the initial powder and ready-to-apply slurry itself were sensitive to temperature, with even slightly warmer than ambient conditions (>28° C.) potentially having a negative impact on leveling and other characteristics. Finally, the BASF slurry formulations still required curing for substantial periods of time (>15 minutes) at elevated temperature (>125° C.

A slurry is modified chemical composition provided as a semiliquid mixture. Typically, slurries consist of fine insoluble particles suspended in water or another a liquid medium to form a "semiliquid mixture". Here, "insoluble particles" means any solid composition possessing a solubility constant, relative to the liquid solvent in question, that results in significant and detectable levels particulates remaining suspended in the liquid. The specific gravity of a given liquid may provide another means for distinguishing slurries from fully dissolved systems. Further still, a slurry tends to lend itself to filtration, whereas a truly dissolved powder coating system will not produce any appreciable mass of solids when subjected to filtration.

The chemical coating industry would welcome a true dry powder coating formulation that, with the simple addition of a liquid carrier, could be applied as a liquid coating having all of the same properties, features, and benefits irrespective of whether applied in dry or liquefied form (i.e., a "liquefiable" or "bifunctional" composition). Further still, a liquefiable or bifunctional composition that did not require volatile organic compounds and/or other expensive or potential harmful solvents is needed. Finally, a bifunctional composition that retains the specialized functionality of existing powder coatings, similar to those identified above and especially for use as low-gloss top coats, would be gladly received.

SUMMARY OF INVENTION

As used herein, a bifunctional composition is a free-flowing, dry mix of various chemical components. This dry powder is amenable to application in its dried form, as in typical powder coating operations, and it can also be dispersed within a liquid carrier and applied using various liquid application techniques. When liquefied, the bifunctional composition possesses a viscosity similar to that of liquid paint, but the powder does not react with or become degraded by its contact with the liquid carrier. Ideally, the bifunctional powders can be dispersed in water-based solutions and/or common solvents, so as to avoid the need for any VOCs or other dangerous and/or expensive solvents.

The inventor has discovered powder compositions may attain bifunctionality when formulated with micronized glass flakes in combination with certain binder systems. This combination enables the resulting blended powder to be used in dry and liquid applications without the need for particle size adjustments, without balancing surfactants and dispersants, and without extended curing at elevated temperatures when the liquefied version of the coating is applied.

In one embodiment, a bifunctional coating composition is contemplated having any combination of the following features:
- a blended, dry mixture of particulates including glass flakes and an extrudate formed from at least one thermosetting resin, wherein all of the particulates have a particle size of less than 500 microns;
- wherein, when the blended, dry mixture is applied to a substrate and exposed to heat, a cures to form a dry powder-based coating;
- wherein the blended, dry mixture forms a liquefied composition when added a liquid carrier and wherein liquefied composition does not include suspended particulates and, within one hour and, more preferably, within ten minutes of being a surface, cures to form a liquefied powder-based coating;
- wherein the thermosetting resin includes at least one selected from: polyurethane, TGIC, primid, epoxy, hybrid polyester, epoxy, urethane-polyester, TGIC-free and acrylic;
- wherein all of the particulates have a particle size greater than 5 microns, greater than 10 microns, greater than 15 microns, or greater than 20 microns;
- wherein all of the particulates have a particle size between 20 and 60 microns;
- wherein the liquid carrier is at least one selected from: distilled water, de-ionized water, acetone, and butanone;
- wherein the liquid carrier is at least one selected from: a hydrocarbon solvent having six or fewer carbon atoms, mineral spirits, turpentine, naphtha, toluene, dimethylformamide, 2-butoxyethanol, a branched alcohol having six or fewer carbon atoms, unsaturated carbon-based solvents and single ring, aromatic alcohols with no further functionalization;
- wherein all of the particulates are fully dissolved in the liquid carrier;
- wherein the glass flakes have a thickness between 1.0 to 1.30 microns;
- wherein the glass flakes have a particle size distribution of 140 to 160 microns;
- wherein the blended, dry mixture also includes at least one additive selected from: a hardener, tetramethoxy glycoluril, a colorant, a pigment, a wax, a catalyst, a flow aid, a degassing agent and a gloss modifier;
- wherein the dry powder-based coating and the liquefied powder-based coating: (i) are chemically identical; and (ii) possess identical physical characteristics with respect to at least one selected from: color, pencil hardness, gloss, crosshatch adhesion, chemical resistance, weathering resistance, taber abrasion, flexibility, mar/scratch resistance, and UV stability;
- wherein the extrudate includes a urethane-polyester resin, a styrene-free acrylic resin with hydroxyl and functionality, and a curative;
- wherein the urethane-polyester resin includes hydroxyl and/or carboxyl functionalities;
- wherein the dry powder-based coating is applied by electrostatic spraying, fluidized bed coating or hot flocking and cures in a convection oven in 15 minutes at 375° F. or 20 minutes at 350° F.; and
- wherein the liquefied powder-based coating is applied by spraying, dipping or flow coating and cures in ambient conditions in 10 minutes.

A method of forming a chemical coating is also contemplated. Here, the method involves providing a dry powder coating formulation including at least one thermosetting resin and glass flakes and said dry powder coating formulation comprising particulates having a particle size between 5 and 500 microns; mixing the dry powder coating formulation with a liquid carrier to form a liquefied composition, said liquefied composition having no particles suspended therein; and applying the liquefied composition to a substrate so that a final, cured chemical coating is formed within less than one hour and, more preferably, within ten minutes after the initial application. Notably, the dry powder coating formulation in this method is also capable of being applied and cured according to conventional techniques for powder coating. Whether applied in dry or liquefied form, the resulting coatings are identical, particularly with respect to color, pencil hardness, gloss, crosshatch adhesion, chemical resistance, weathering resistance, taber abrasion, flexibility, mar/scratch resistance and UV stability.

Further reference is made to the appended claims and description below, all of which disclose elements of the invention. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Any elements described herein as singular can be pluralized (i.e., anything described as "one" can be more than one). Any species element of a genus element can have the characteristics or elements of any other species element of that genus. The described configurations, elements or complete assemblies and methods and their elements for carrying out the invention, and variations of aspects of the invention can be combined and modified with each other in any combination. As used herein, the words "example" and "exemplary" mean an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Powder coatings have particular utility in industrial and commercial applications, as well as in connection with military and government applications, owing to their improved durability over liquid painted coatings. This durability can be attributed, in part, to the ability to produce thicker coatings in a single application without concerns about running, sagging, or pooling.

Certain types of applications are particularly amenable to powder coating. For example, equipment for use by the military must be able to withstand exposure to certain chemical agents. In particular, the United States Department of Defense has published a detailed specification (MIL-DTL-32348, incorporated by reference along with any other specifications, standards, and test regimes contemplated therein) providing details on the desired characteristics, procedures, and quality control requirements for such chemical agent resistant coatings (CARC) in powder form. Notably, the powder coatings are required to meet certain physical characteristics, including color, gloss, scratch resistance, etc., depending upon their intended use as either finish coatings or primers.

In order to prepare the bifunctional composition, optional pigments may be blended, e.g., using a master batch, with other constituents such as resins, curatives and flow aids. The component constituents comprising the admixture are extruded to distribute the constituents to form an extrusion product. Any suitable extruder may be used, including both singe or twin screw mechanisms. In one embodiment, the blended constituents are placed in the extruder hopper and fed via the screw mechanism to the extruder die, preferable with a plurality of controlled temperature zones.

A liquefiable or bifunctional coating is a powder coating that, once mixed with a liquid carrier, is soluble. "Solubility" is defined as the ability of a solute to dissolve in a solvent, with the powder/particulate dissociating in the liquid under ambient conditions to such a degree that particulates are no longer readily identified or suspended within the liquid. The resulting solution is called a saturated solution. Thus, a saturated (or partially saturated) solution is differentiated from a slurry by the slurry's inability to completely dissolve the powder, resulting in a higher viscosity that is characteristic of a semiliquid solution.

In one embodiment, the additives and fillers discussed herein are incorporated into the resin and then blended, extruded, milled, and sieved to form a solid resin powder. The powder is comprised of particulates that, collectively, have an average particle size of about 25 to 35 microns in one embodiment. In other embodiments, the average size of the powder coating particle may range from 20 to 60 microns, with any combination of two separate, whole integers within that range serving as upper and lower limits (e.g., 22 to 48, 50 to 54, etc.). The particulate size can be adjusted by any known means, including grinding/impact milling (rotor, ball, hammer, jet, centrifugal, etc.), with selection of the appropriate range by way of sieving and/or by the functional aspects of the mill itself.

Further still, average particle size should be contrasted against the range of distribution for all of the particles within that range. That is, in some embodiments, the blended, extruded, and milled bifunctional composition (in its particulate/powdered form) may have an average particle size between 20 and 60 microns, but individual particles in that distribution may still fall above or below those ranges. Accordingly, another aspect may involve all or a defined percentage of the particles (on a mass or volume basis, e.g. 50 wt. %, 50 vol. %, etc.) in the distribution having a size of at least 5 microns, conversely, the largest particle does not exceed 500 microns. In further embodiments, the smallest particles may be at least 5, 10, 15, or 20 microns in size, while the largest particles do not exceed 400, 300, 200, 100, 90, 80, 70, or 60 microns in size. Ranges encompassing any combination of whole integers between 5 and 500 are also expressly contemplated.

Still other measures may be used to characterize the particle size distribution in certain aspects of the invention. When these distributions are plotted on a weight or volume basis along the y-axis and particle size along the x-axis, the profile of the curves may include a single peak or multimodal distributions.

All references to particle size are based upon conventional measurement techniques, preferably relying upon high definition image processing, analysis of Brownian motion, sieving, and/or light or x-ray scattering by the particles. ASTM D1921-08 provides an example of a conventional method for determining particle size of plastic materials by sieving, while ASTM D5861-07 provides guidance on particle size measurements for coating powders. More generally, ASTM D3451-06 provides a summary of various standard tests for such coating powders. All of these standards, as well as any additional standards relied upon or cross-referenced therein, are incorporated by reference.

The inventors believe that the selection of binder components, glass flake, and liquid carriers are of particular importance to imparting bifunctionality. When liquefied, this combination of elements effectively behaves as if the solids are dissolved within solution. Comparatively speaking, slurries are semiliquid mixtures that do not fully dissolve and have a viscosity that is much higher, when compared to the liquefied powders contemplated herein. For example, liquefiable powder coating compositions have a much lower viscosity in comparison to conventional, slurry-based coatings. Viscosity can be measured on a comparative basis using any standard rheometer or viscometer (e.g., falling ball, cup, conistometer, glass capillary, tuning fork vibration, rotational, etc.) under identical conditions for each fluid tested. Common, commercially available instruments can be used, or skilled persons will discern methodologies appropriate to the circumstances presented by the liquefied compositions contemplated herein (as well as the aforementioned, prior art slurries).

Spherical glass flakes, in particular act as a barrier for the coating system by adding an element of porosity in the formulation and by providing a faster atmospheric cure rate and increase durability of the coating regardless of whether in powder or liquid form. The preferred glass type is electrically and chemically resistant (ECR), so as to avoid any unwanted reactions with the other powder constituents during extrusion and grinding of the powder, as well as in the process of curing the coating itself. Certain types of C-glass may also be useful.

The particle size and particle size distribution of the glass flakes are also significant. The glass flakes should be selected to have a relatively compact particle size distribution, with an average size that allows the flakes to quickly and easily disperse. Preferably, the flakes are added during the extrusion of the powder (i.e., before grinding) so as to ensure the glass is uniformly and widely dispersed in the final powder. The nominal thickness of the glass flakes falls between 1.0 to 1.30 microns with a particle size distribution of 140 to 160 microns.

In the same manner, the carrier should be a common and widely available liquid that can disperse the powder while withstanding the rigors of liquid coating techniques. Water is particularly attractive owing to its ubiquity. In some aspects, distilled and/or de-ionized water should be used. In another embodiment, seawater could be used, preferably after filtering to remove unwanted particulates and flora/fauna.

Depending on the end use and the industry, liquids amenable for use with the bifunctional composition include water (distilled and/or deionized), water-based solutions (i.e., where water comprises at least 90 wt. % of the total mass of solution), acetone, methyl-ethyl ketone (butanone or MEK) and ethanol. Other possibilities are low or short-chain hydrocarbon liquids (i.e., ($\leq$6 carbon), mineral spirits, turpentine, naphtha, toluene, dimethylformamide (DMF), 2-Butoxyethanol, other glycol ethers, and/or other branched alcohols (preferably with six or fewer carbons), as well as unsaturated carbon-based solvents and single ring, non-functionalized aromatic alcohols. Depending upon miscibility and ambient conditions, any combination of the foregoing liquids could also be employed. The volume of liquid(s) added to a powder coating is based on the specific gravity of the overall formulation, which itself heavily depends on pigmentation concentration. Specific gravity may be measured according to ASTM D5965.

The bifunctional compositions herein should also include at least one thermosetting resin chemistry. Non-limiting examples include: polyurethanes, triglycidyl isocyanurate-based ("TGIC"), TGIC-free, primid, epoxy, hybrid polyester, urethane-polyester, and acrylic, that once formulated, show thermoplastic-like functionalities.

Notably, any number of performance-related packages could be incorporated into the bifunctional formulations contemplated herein. Conventional additives such as hardeners, tetramethoxy glycoluril, colorants, pigments, waxes, catalysts, flow aids, degassing agents and gloss modifiers may be included in the powder coating material composition to enhance or avoid specific traits in the composition as it cures and/or after it has hardened into its final, cured condition. Additional exemplary resins and additives are disclosed in all of the references incorporated by reference. Still other components may be mixed into or formed as part of the extruded powder.

In one embodiment, the powder itself is primarily composed of a combination of resins. In particular, a urethane-polyesters resin and a styrene-free acrylic resin with hydroxyl and functionality are combined with a curative and micronized glass. The urethane-polyester may have hydroxyl and/or carboxyl functionalities.

In either its dry powder or liquidized form, the bifunctional coating composition can be applied on various substrate types such as plastic, metal, aluminum, wood, concrete, paper, cloth, stucco and a host of other materials to act as a coating. To be liquefiable as contemplated herein, the coverage and performance of the final, cured coating should be comparable irrespective of whether the composition was originally applied as dry powder or as a liquefied product.

In either application method (dry or liquidized), the resulting, cured coating is sufficient to serve as a primer coating according to applicable specifications (including those herein). In further embodiments, the coating—applied in either dried or liquid form—is sufficient to meet the specifications of a topcoat, particularly for use as a chemical agent resistant coating (again as noted herein). In all instances, the cured coatings contemplated by the dried and/or liquid application methods can be matched to any number of standard colors used in common government and military applications (e.g., green, tan, black, gray, etc.).

Most significantly, the final coatings produced by the bifunctional compositions herein are indistinguishable, regardless of whether applied via dry powder or via liquefied composition. Specifically, the coatings will possess the same chemical constituents. Further, any one or combination of the following traits will be identical or nearly identical (as dictated by constraints in the precision of some measurements): color, pencil hardness, gloss, crosshatch adhesion, chemical resistance, weathering resistance, taber abrasion, flexibility, mar/scratch resistance and UV stability.

Means for testing these traits of the coatings can be performed with any number of instruments and/or according to established standards. Without limiting the range of possibilities, one example of pencil hardness test can be found in ASTM D3363-92a; gloss under ASTM D523-89; crosshatch adhesion via ASTM D3359-97; weathering resistance via ASTM B117-97; taber abrasion by ASTM D4060-14; flexibility in ASTM D522-93a; and UV stability according to ASTM D5894-16. Comparative testing (of the dry powder-based and liquefied composition-based coatings) and qualitative inspections may also be relevant for any/all of the aforementioned traits. Further, still other methods and means may be available and would prove useful, so long as they demonstrate the similarities and, effectively speaking, identical characteristics between the dry powder-based and liquefied composition-based coatings. Chemical resistance will be particular to the substances of interest, while mar/scratch resistance can be examined for optical defects based upon friction, wear, erosion, abrasion, and cracking for mechanical defects.

In another aspect, a method of applying a coating is contemplated. A powder coating composition according to any of the formulations described or incorporated by reference herein, including glass flakes of the type and size contemplated above is provided or prepared. One or more liquid carriers are then introduced to a predetermined amount of powder. Liquid(s) is/are added and mixed in order to liquefy the powder coating. The viscosity of the liquefied mixture is monitored during the addition of the liquid so as to match a predetermined viscosity, although additional amounts of powder may be added to increase the viscosity. In some embodiments, non-reactive, chemically and thermally tolerant thickeners may be added to the powder to allow for further adjustments of viscosity. This approach is particularly useful to controllably adjust the viscosity of the liquidized powder so as to allow the use of existing liquid coating equipment.

By judiciously selecting the powder components and carrier liquid, it is possible to avoid the use or need for volatile and/or organic solvents and compounds, particularly those used in liquid paint formulations. In turn, the need for specialized environmental equipment (to remove and/or mitigate against the use of hazardous or dangerous liquids) can be minimized or avoided entirely.

In some embodiments, the liquid carrier is driven off by ambient conditions. The method of applying the liquidized powder (methods include: spraying, dipping and flow coating) paint may also, in certain instances, facilitate evaporation of the liquid as it is being applied (e.g., by application in a heated state and/or to a heat article). The molecular interactions of the liquefied composition itself may also promote exothermic conditions to drive liquid out of the coating after it has been applied. In any combination of these manners, it is possible to cure the liquefied powder coating in a relatively short period of time. The activation time for the liquidized coating would be less than 10 minutes when air dried. Whereas, the cure time powder coating on average would take 15 minutes at 375° F. or 20 minutes at 350° F. in a convection oven.

The bifunctional composition can also be applied as a conventional dry powder. Methods applying the composition to a substrate in its dry form include electrostatic spraying, fluidized bed coating, and/or hot flocking.

Prior art technologies (i.e., slurry, dry powder, and liquid paint) lack the ability to be applied as a powder and a liquid. Slurries are "semiliquid" mixtures that function as neither a powder or a liquid. When slurry, dry powder, liquid paint and our liquefied bifunctional coating are put through a filter, dry powder has the highest amount of particulates left on the filter. Slurry yields a considerable amount of particulates left, but less than dry powder, while liquid paint and the liquefied bifunctional coating have only tiny amounts of particulates left on the filter. Thus, the liquefied bifunctional composition provides s a saturated solution with comparable particulates to those found in paint, so to fully dissolve into the solvent/liquid carrier, whereas dry powder and slurries do not.

Another important measure is viscosity which is a measure of a fluid's resistance to flow. A fluid with larger viscosity resists motion because its molecular makeup gives it a lot of internal friction. Comparative tests for viscosity measurements were run on a slurry, liquid coating and the liquefied powder using a rheometer, which measured viscosity by keeping the fluid stationary and moving an object through it. The drag caused by relative motion of the fluid and a surface of the object gives us an exact measure of the viscosities. Results obtained showed that slurries and semiliquids have a viscosity that is much higher, when compared to liquid or liquefied bifunctional coatings.

The import of these differences in solubility and viscosity is that, unlike slurries, liquefiable/bifunctional compositions according to the present invention may be used as conventional dry powder coatings or mixed with one or more liquid carriers and applied in a manner similar to paint—without any further processing or alteration to the composition itself. As such, greater flexibility can be realized in manufacturing processes, as well as the other advantages identified above.

Generally speaking, chemical components and related constituent items should also be selected for workability, cost, and weight. Unless specifically noted, all tests and measurements are conducted in ambient conditions according to commonly accepted measurement protocols (e.g., such as those regularly published by ASTM International) and relying upon commercially available instruments according to the manufacturer-recommended operating procedures and conditions. Specific tests and regimens identified in the military specifications noted above may be particularly informative, including ASTM E308, E1331, D3723, D476 (type III or IV), D3335, D3271, D2805, D1849, D522, D3359, G154, G90, and B117. Unless noted to the contrary (explicitly or within the context of a given disclosure), all measurements are in grams and all percentages are based upon weight percentages.

While individual aspects of the invention are recited above, it is possible to couple specific features and limitations associated with one aspect to that of another aspect. Further, the functions and actions associated with the method aspect may further inform the structural features of apparatus aspects noted herein. Any of these foregoing features may form the basis for subsequent claims to still further aspects of the invention, even though all of those aspects may not be individually recited herein. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. The claims as follows are intended to include all modifications and alterations insofar as they come within the scope of the claims or the equivalent thereof.

We claim:

1. A bifunctional coating composition comprising: a blended, dry mixture of particulates including glass flakes and an extrudate formed from at least one thermosetting resin, wherein all of the particulates have a particle size of less than 500 microns; wherein, when the blended, dry mixture is applied to a substrate and exposed to heat, the blended, dry mixture cures to form a dry powder-based coating; and wherein, when added a liquid carrier, the blended, dry mixture forms a liquefied composition and wherein the liquefied composition does not include suspended particulates and, within one hour of being applied to a surface, cures to form a liquefied powder-based coating;

wherein the liquid carrier is at least one selected from the group consisting of distilled water, de-ionized water, acetone, butanone, a hydrocarbon solvent having six or fewer carbon atoms, mineral spirits, turpentine, naphtha, toluene, dimethylformamide, 2-butoxyethanol, a branched alcohol having six or fewer carbon atoms, an unsaturated carbon-based solvent and a single ring, aromatic alcohol with no further functionalization; and wherein at least one of the following is true:
the glass flakes have a thickness between 1.0 to 1.30 microns,
the glass flakes have a particle size distribution of 140 to 160 microns, and
the extrudate includes a urethane-polyester resin, a styrene-free acrylic resin with hydroxyl functionality, and a curative.

2. The bifunctional coating composition of claim 1 wherein the thermosetting resin includes at least one selected from: polyurethane, triglycidyl isocyanurate (TGIC), primid, epoxy, urethane-polyester, and acrylic.

3. The bifunctional coating composition according to claim 1 wherein all of the particulates have a particle size greater than 5 microns.

4. The bifunctional coating composition according to claim 1 wherein all of the particulates have a particle size between 20 and 60 microns.

5. The bifunctional coating composition according to claim 1 wherein the liquid carrier is at least one selected from: distilled water, de-ionized water, acetone, and butanone.

6. The bifunctional coating composition according to claim 1 wherein the liquid carrier is at least one selected from: a hydrocarbon solvent having six or fewer carbon atoms, mineral spirits, turpentine, naphtha, toluene, dimethylformamide, 2-butoxyethanol, a branched alcohol having six or fewer carbon atoms, an unsaturated carbon-based solvent and a single ring, aromatic alcohol with no further functionalization.

7. The bifunctional coating composition according to claim 1 wherein all of the particulates are fully dissolved in the liquid carrier.

8. The bifunctional coating composition according to claim 1 wherein the glass flakes have a thickness between 1.0 to 1.30 microns.

9. The bifunctional coating composition according to claim 1 wherein the glass flakes have a particle size distribution of 140 to 160 microns.

10. The bifunctional coating composition according to claim 1 wherein the blended, dry mixture also includes at least one additive selected from: a hardener, tetramethoxy glycoluril, a colorant, a pigment, a wax, a catalyst, a flow aid, a degassing agent and a gloss modifier.

11. The bifunctional coating composition according to claim 1 wherein the dry powder-based coating and the liquefied powder-based coating: (i) are chemically identical; and (ii) possess identical physical characteristics with respect to at least one of: color, pencil hardness, gloss, crosshatch adhesion, chemical resistance, weathering resistance, taber abrasion, flexibility, mar/scratch resistance and UV stability.

12. The bifunctional coating composition according to claim 1 wherein the extrudate includes a urethane-polyester resin, a styrene-free acrylic resin with hydroxyl functionality, and a curative.

13. The bifunctional coating composition according to claim 12 wherein the urethane-polyester resin includes hydroxyl and/or carboxyl functionalities.

14. The bifunctional coating composition according to claim 1 wherein the dry powder-based coating is applied by electrostatic spraying, fluidized bed coating or hot flocking and cures in a convection oven in 15 minutes at 375° F. or 20 minutes at 350° F.

15. The bifunctional coating composition according to claim 1 wherein the liquefied powder-based coating is applied by spraying, dipping or flow coating and cures in ambient conditions in 10 minutes.

16. The bifunctional coating composition according to claim 1 wherein the liquefied powder-based coating forms within ten minutes of being applied to the surface.

17. A method of forming a chemical coating comprising: providing a dry powder coating formulation including glass flakes and an extrudat formed from at least one thermosetting resin and said dry powder coating formulation comprising particulates having a particle size between 5 and 500 microns; mixing the dry powder coating formulation with a liquid carrier to form a liquefied composition, said liquefied composition having no particles suspended therein; and applying the liquefied composition to a substrate so that a final, cured chemical coating is formed within less than one hour after application, wherein at least one of the following is true:
the glass flakes have a thickness between 1.0 to 1.30 microns,
the glass flakes have a particle size distribution of 140 to 160 microns, and
the extrudate includes a urethane-polyester resin, a styrene-free acrylic resin with hydroxyl functionality, and a curative.

18. The method according to claim 17 wherein the final, cured chemical coating is formed within less than ten minutes after application.

19. The method according to claim 17, wherein the glass flakes have a thickness between 1.0 to 1.30 microns, the glass flakes have a particle size distribution of 140 to 160 microns, or both.

20. The method according to claim 17, wherein the extrudate includes a urethane-polyester resin, a styrene-free acrylic resin with hydroxyl functionality, and a curative.

* * * * *